Patented Dec. 19, 1950

2,535,011

UNITED STATES PATENT OFFICE 2,535,011

FORMATION OF DIETHER ESTERS

Willard J. Croxall, Bryn Athyn, and John O. Van Hook, Philadelphia, Pa., assignors to Rohm & Haas Company, Philadelphia, Pa., a corporation of Delaware No Drawing. Application October 2, 1948,
Serial No. 52,603

5 Claims. (Cl. 260—484)

This invention concerns the preparation of diether esters of the formula

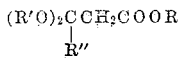

wherein R'' represents hydrogen or the —COOR group, R represents the residue of a neutral, non-tertiary, monohydric alcohol, ROH, and R' represents the residue of a neutral, non-tertiary, monohydric alcohol, R'OH.

These diether esters are prepared by reacting an alcohol, R'OH, with an ester of the formula

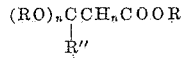

where $n$ is an integer from one to two and R and R'' have the same significance as above, in the presence of a boron trifluoride catalyst.

As a boron trifluoride catalyst, there may be used boron trifluoride itself or a complex thereof formed with an oxygenated compound. The complexes formed with aldehydes, alcohols, carboxylic acids, ethers, and ketones are particularly convenient for use. Typical of these are

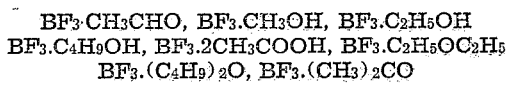

and the like. A small amount of such a coordinated complex of boron trifluoride or of boron trifluoride is used in the reaction mixture, 0.01% to 1% thereof on the weight of the mixture being generally sufficient.

The alcohol R'OH is broadly any primary or secondary monohydric alcohol free of groups reacting with an acid. It may be aliphatic, cycloaliphatic, arylaliphatic, or heterocyclic. It may be saturated or unsaturated. In the latter case, it may be mentioned if acyclic β,γ-unsaturation is present, reaction temperatures should be held below 150° C. to avoid a rearrangement which occurs at 150° C. and higher in the case of this particular type of unsaturation.

Commonly R', the residue of the alcohol R'OH, is a hydrocarbon group. It is most convenient to work with such groups of not over twelve carbon atoms. Yet, this group is not limited thereto. It may contain inert substituents such as ether or thio-ether linkages. The following groups are illustrative of the types and sizes which may be used for R'—Methyl, ethyl, isopropyl, propyl, butyl, isobutyl, sec.-butyl, amyl, hexyl, 2-ethylbutyl, heptyl, isoheptyl, capryl, 2-ethylhexyl, octyl, isooctyl, nonyl, isononyl, decyl, dodecyl, cetyl, stearyl, methallyl, undecenyl, oleyl, cyclohexyl, methylcyclohexyl, tetrahydrobenzyl, hexahydrobenzyl, endomethylene hexahydrobenzyl, benzyl, methylbenzyl, butylbenzyl, methoxyethyl, ethoxyethyl, butoxyethyl, octoxyethyl, phenoxyethyl, benzoxyethyl, cyclohexoxyethyl, propoxypropyl, ethoxypropyl, ethoxyethoxyethyl, butoxyethoxyethyl, diisobutylphenoxyethyl, diisobutylphenoxyethoxyethyl, ethylthioethyl, butylthioethyl, etc. The groups thus far recited may also occur as R in the ether esters.

In addition to the above groups, R' may contain a halogen or a nitro group, as in chloroethyl, bromopropyl, chlorobutyl, chloroamyl, nitroethyl, nitropropyl, nitrobutyl, and the like. The important consideration for determining the group R' is that it be unreactive to acids, since the reaction of this invention utilizes catalysts which are strongly acidic.

When transetherification is involved, the alcohol R'OH should boil higher than ROH. Complete replacement of ROH by R'OH is then conveniently obtained. Otherwise, mixed ethers or a mixture of ethers may result. When, however, the ether esters used are unsaturated, $n$ having a value of one, the alcohol R'OH may boil higher or lower than ROH; it may even be the same as ROH. The β-ether acrylate or ether maleate is then converted to a β,β-diether propionate or diether succinate, respectively.

Esters of the formula

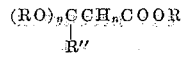

are available through the reaction of acetylene and esters of carbonic acid, $(RO)_2CO$, in the presence of an anhydrous alkaline catalyst. Complete details of this process are given in application Serial No. 52,607, filed October 2, 1948. By the process there described, there are obtained β,β-diether-substituted propionates

and β-ether-substituted acrylates. These may be obtained in separate fractions or mixtures thereof may be obtained. When the ether propionates are heated in the presence of an alkaline or an acid catalyst and a mole of alcohol is separated per mole of propionate, the related ether acrylate results. This is a convenient procedure when it is desirable to deal with less of the alcohol ROH in the process of this invention. The details of the conversion of ether propionates to ether acrylates are related in application Serial No. 52,608, filed October 2, 1948.

Along with the ether propionates and acrylates prepared by the reaction of acetylene on esters of carbonic acid, there are obtained ether succinates of the formula

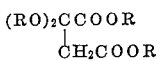

and related maleates

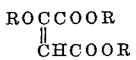

The latter are derivable from the former by the procedure described above for converting diether propionates to ether acrylates.

In the reaction of acetylene and organic carbonates, the reaction is effected at 20° C. to 110° C. in the presence of such strongly alkaline catalysts as alkali metal acetylides, alkali metal alcoholates, and quaternary ammonium alkoxides. Typical of these are lithium methoxide, sodium methoxide, sodium butoxide, sodium heptoxide, sodium dodecylate, potassium ethylate, potassium amylate, potassium octoxide, benzyl trimethyl ammonium methoxide, dibenzyl dimethyl ammonium ethoxide, tetramethyl ammonium methoxide, methylbenzyl trimethyl ammonium tert.-butoxide, and the like.

The organic carbonate, $(RO)_2CO$, may contain as R any of the groups which have been shown above. It is preferable that R be a hydrocarbon group, particularly one of not over twelve carbon atoms, and that it be free from acyclic $\beta,\gamma$-unsaturation, even though R is not confined to hydrocarbons. It is especially convenient to have R an ethyl or methyl group, since the ethyl and methyl ether esters are particularly economical to make and to use.

Some typical ether esters which may be prepared by the method described above are methyl $\beta$-methoxyacrylate, methyl $\beta,\beta$-dimethoxypropionate, dimethyl $\alpha,\alpha$-dimethoxysuccinate, dimethyl methoxymaleate, ethyl $\beta$-ethoxyacrylate, ethyl $\beta,\beta$-diethoxypropinate, diethyl $\alpha,\alpha$-diethoxysuccinate, diethyl ethoxymaleate, butyl $\beta$-butoxyacrylate, butyl $\beta,\beta$-dibutoxypropionate, dibutyl $\alpha,\alpha$-dibutoxysuccinate, dibutyl butoxymaleate, octyl $\beta,\beta$-dioctoxypropionate, cyclohexyl $\beta,\beta$-dicyclohexoxypropionate, benzyl $\beta,\beta$ - dibenzoxypropionate, ethoxyethyl $\beta,\beta$-diethoxyethylpropionate, ethylthioethyl $\beta$ - ethylthioethoxyacrylate, methallyl $\beta,\beta$-methalloxypropionate, etc.

To illustrate the preparation of $\beta,\beta$-diether propionates and diether succinates, there is given the following example of the preparation of these ether esters. The apparatus used for reaction of acetylene and organic carbonate comprised a five-liter flask equipped with a gas-tight stainless steel stirrer, the blades of which scraped the bottom of the flask. For the preparation of the catalyst, 225 grams of anhydrous ethyl alcohol was placed in the flask and thereto was gradually added sodium in small cubes until thirty grams of this metal had been used. The sodium was dissolved; the excess alcohol was then evaporated under reduced pressure. The sodium ethylate remained as a dry powder. There was added to the flask at this point 2200 grams of anhydrous diethyl carbonate.

The flask was then equipped with gas inlet and outlet tubes, a manometer, and thermometer. The flask was flushed with nitrogen and heated to about 80° C. Acetylene was passed into the system. This gas was taken from a commercial cylinder but was scrubbed with water and sulfuric acid and was then passed over soda-lime. When the rate of absorption of acetylene became very slow, the flask was cooled and the flow of acetylene was discontinued. Dilute acetic acid was added to the system to destroy the alkaline catalyst. Two layers formed in the flask. The upper, oily layer was separated and fractionally distilled.

A forerun was obtained at normal pressure. It consisted of ethyl alcohol and ethyl carbonate. Distillation was continued under reduced pressure. A fraction was taken off at 65° to 75° C./2 to 4 mm. This was found to consist of about 10% of ethyl $\beta$-ethoxyacrylate and 90% of ethyl $\beta,\beta$-diethoxypropionate. There was then obtained at 75° C./4 mm. a fraction of pure ethyl $\beta,\beta$-diethoxypropionate. There was then taken off a fraction between 75° C./4 mm. and 114° C./3 mm. which was a mixture of ethyl $\beta,\beta$-diethoxypropionate and diethyl $\alpha,\alpha$-diethoxysuccinate. At 114°–115° C./3–4 mm., there was then obtained a fraction consisting of diethyl $\alpha,\alpha$-diethoxysuccinate. On further distillation, a fraction containing this succinate with some diethyl $\alpha$-ethoxymaleate was obtained.

The alcohol R'OH may be used in stoichiometric excess of the ether esters and serve as a solvent. There may also be used an inert organic solvent, such as a naphtha, or an aromatic hydrocarbon such as benzene, toluene, or xylene, or a chlorinated hydrocarbon.

The reaction between the alcohol R'OH and ester $(RO)_nC(R'')CH_nCOOR$ is effected in the presence of a boron trifluoride catalyst between about 20° C. and 200° C., preferably 100° C. to 145° C. The reaction may be effected under normal, increased, or reduced pressure. When the reaction has been carried on, the catalyst is destroyed, as by washing with water or neutralizing with an alkaline agent, such as sodium carbonate, potassium carbonate, sodium hydroxide, or the like. The reaction product may then be obtained. Unreacted alcohol or solvent may be stripped off. The reaction product, $$(R'O)_2C(R'')CH_2COOR$$

is then isolated, usually by distillation at low pressure.

When the starting material is one of the unsaaturated ether esters, a mole of alcohol adds thereto to give

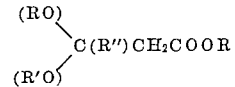

If the reaction temperature is raised, particularly if the alcohol ROH is taken off by distillation, the RO— group is displaced. There is then obtained the compound, $$(R'O)_2C(R'')CH_2COOR$$

Similarly, when the starting compound $$(RO)_2C(R'')CH_2COOR$$

is heated with two moles of R'OH, there results $$(R'O)_2C(R'')CH_2COOR$$

The reaction is halted when about two moles of ROH have been taken off per mole of such ether ester.

The reaction will be illustrated by specific examples which bear on the various situations just discussed. It will be evident that the specific reactants used for illustrative purposes can be replaced with any of the others discussed above.

Example 1

A mixture of seventy-two grams (0.5 mole) of ethyl β-ethoxyacrylate, twenty-three grams (0.5 mole) of anhydrous ethanol, and five milliliters of a boron trifluoride-ethyl ether complex formed from an equal volume of each in a stoppered flask was allowed to stand at 30° C. for sixty hours. It was then washed with water until the water layer was neutral. The organic layer was then dried over anhydrous magnesium sulfate and distilled. There were obtained 10.5 grams of a mixture composed of 35% ethyl β-ethoxyacrylate and 65% ethyl β,β-diethoxypropionate (as estimated from refractive index), which distilled at 47°–52° C./0.3 mm. and had a refractive index, $n_D^{20}$, of 1.4240, and 57.5 grams of ethyl β,β-diethoxypropionate, which distilled at 52°–54° C./0.3 mm., had a refractive index, $n_D^{20}$, of 1.4120, and gave upon analysis a saponification equivalent of 186. Ethyl β,β-diethoxypropionate ($C_9H_{18}O_4$) has a refractive index, $n_D^{20}$, of 1.4122 and a theoretical saponification equivalent of 190. The total yield of this product was 72%.

Example 2

A mixture of seventy-two grams (0.5 mole) of ethyl β-ethoxyacrylate, thirty-seven grams (0.5 mole) of n-butanol, and five milliliters of the boron trifluoride-ethyl ether complex was allowed to stand in a stoppered flask for fifteen hours. After this time, it was washed with water until the water layer became neutral. The organic layer was then dried over anhydrous magnesium sulfate and distilled. There were obtained ten grams of a mixture of ethyl β-ethoxyacrylate and ethyl β-ethoxy-β-n-butoxypropionate, which distilled at 40°–65° C./0.4 mm. and had a refractive index, $n_D^{20}$, of 1.4312, and eighty-six grams of ethyl β-ethoxy-β-n-butoxypropionate, which distilled at 65°–102° C./0.4 mm. and had a refractive index, $n_D^{20}$, of 1.4220. The eighty-six grams of this product represents a yield of 79%. Upon redistillation, the product boiled at 75°–85° C./ 0.45 mm., had a refractive index, $n_D^{20}$, of 1.4200, a density, $$d_{20}^{20}$$

of 0.9556, and gave upon analysis a saponification equivalent of 216 and a molecular refraction, $MR_D$, of 57.73. Ethyl β-ethoxy-β-n-butoxypropionate ($C_{11}H_{22}O_4$) has a theoretical saponification equivalent of 218 and a molecular refraction, $MR_D$, of 57.94.

Example 3

A mixture of seventy-two grams (0.5 mole) of ethyl β-ethoxyacrylate, 148 grams (2.0 moles) of n-butanol, and three milliliters of the boron trifluoride-ethyl ether complex was heated under a one-foot packed column. There were obtained on distillation fourteen grams of ethanol, which distilled at 76°–85° C. while the pot temperature rose from 115° to 119° C., and seventy-seven grams of unreacted butanol, which distilled at 33°–59° C./50 mm. The residue was cooled and diluted with ether, washed with water until the water layer became neutral, and the organic layer dried over anhydrous calcium sulfate and distilled. There were obtained 8.5 grams of unreacted ethyl β-ethoxyacrylate, which distilled at 52°–82° C./0.2 mm. and had a refractive index, $n_D^{20}$, of 1.4459, and seventeen grams of a mixture of ethyl β-ethoxyacrylate and ethyl β,β-di-(n-butoxy)propionate, which distilled at 82°–95° C./0.2 mm. and had a refractive index, $n_D^{20}$, of 1.4327. There was then obtained seventy-five grams of ethyl β,β-di-(n-butoxy)propionate, which distilled at 95°–107° C./0.2 mm., had a refractive index, $n_D^{20}$, of 1.4265, and gave upon analysis a saponification equivalent of 244. Ethyl β,β-di-(n-butoxy)propionate ($C_{13}H_{26}O_4$) has a theoretical saponification equivalent of 246.

Example 4

A mixture of 190 grams (1.0 mole) of ethyl β,β-diethoxypropionate, 352 grams (4.0 moles) of n-amyl alcohol, and four milliliters of the boron trifluoride-ethyl ether complex was heated under a two-foot packed column. There was obtained on distillation ninety-five grams of ethanol, which boiled at 78° C., while the pot temperature rose from 119° to 160° C. The column was removed and 134 grams of excess amyl alcohol separated therefrom at 138°–148° C. while the pot temperature rose from 160° to 215° C. The residue was cooled, diluted with ether, and washed with water until the water layer became neutral. The organic layer was then dried over anhydrous calcium sulfate and distilled from a Claisen flask. After removal of ether, there were obtained eighteen grams of unreacted n-amyl alcohol, which distilled at 29°–38° C./1 mm., twelve grams of a mixture of n-amyl alcohol, ethyl β-ethoxyacrylate, and ethyl β,β-di-(n-amyloxy)propionate, which distilled at 38°–102° C./0.75 mm. and had a refractive index, $n_D^{20}$, of 1.4422, and 187 grams of ethyl β,β-di-(n-amyloxy)propionate, which distilled at 102°–143° C./0.8 mm. and had a refractive index, $n_D^{20}$, of 1.4366. The 187 grams of product represents a yield of 68%. The product, upon redistillation, boiled at 107°–109° C./0.2 mm., had a refractive index, $n_D^{20}$, of 1.4337; a density, $$d_{20}^{20}$$

of 0.9322; and gave upon analysis a saponification equivalent of 266, a molecular refraction, $MR_D$, of 76.49, a carbon content of 66.01%, and a hydrogen content of 11.18%. Corresponding values for ethyl β,β-di-(n-amyloxy)propionate ($C_{15}H_{30}O_4$) are: Molecular refraction, $MR_D$, 76.41; saponification equivalent, 274; carbon content, 65.69%, and hydrogen content, 10.95%.

Example 5

A mixture of 190 grams (1.0 mole) of ethyl β,β-diethoxypropionate, 296 grams (4.0 moles) of n-butanol, and two milliliters of the boron trifluoride-ethyl ether complex was heated in a flask under a two-foot packed column. There were obtained on distillation ninety-one grams of ethanol, which distilled at 78°–83° C. and had a refractive index, $n_D^{20}$, of 1.3620, and seventy-two grams of excess n-butanol, which distilled at 112°–117° C. and had a refractive index, $n_D^{20}$, of 1.3960, while the pot temperature rose from 107° C. to 140° C. The residue was cooled and washed with water until the water layer became neutral. The organic layer was dried over anhydrous magnesium sulfate and distilled. There were obtained an additional nine grams of n-butanol, which distilled at 24°–62° C./1 mm. and had a refractive index, $n_D^{20}$, of 1.4090, twenty-six grams of a mixture of ethyl β-ethoxyacrylate and ethyl β,β-di-(n-butoxy)propionate, which distilled at 62°–95° C./0.3 mm. and had a refractive index, $n_D^{20}$, of 1.4371, and 180 grams of ethyl β,β-di-(n-butoxy)propionate, which distilled at 78°–87° C./0.1 mm. and had a refractive index, $n_D^{20}$, of 1.4240. The 180 grams represents a yield of 73%. Upon redistillation, the product boiled at 92°–94° C./0.3 mm.; had a refractive index, $n_D^{20}$, of 1.4230; a density, $d_{20}^{20}$ of 0.9257, and gave the following analytical values: Molecular refraction, $MR_D$, 67.67; saponification equivalent, 245; carbon content, 63.27%, and hydrogen content, 10.53%. Corresponding values for ethyl β,β-di-(n-butoxy)propionate ($C_{13}H_{26}O_4$) are: Molecular refraction, $MR_D$, 67.17; saponification equivalent, 246; carbon content, 63.41%, and hydrogen content, 10.57%.

*Example 6*

A mixture of 131 grams (0.5 mole) of diethyl α,α-diethoxysuccinate, 111 grams (1.5 moles) of n-butanol, and fifteen milliliters of the boron trifluoride-ethyl ether complex was heated in a flask under a two-foot column. There were obtained on distillation 43.5 grams of ethanol, which distilled at 78° to 85° C. and has a refractive index, $n_D^{20}$, of 1.3619, while the pot temperature rose to 145° C., and thirty-nine grams of unreacted n-butanol, which distilled at 64°–67° C./80 mm. and had a refractive index, $n_D^{20}$, of 1.3965. An attempt to continue the distillation at this point in a high vacuum led to decomposition. The residue was cooled and washed with water until the water layer became neutral. The organic layer was dried over anhydrous calcium sulfate and distilled from a Claisen flask. There were obtained sixteen grams of diethyl n-butoxymaleate, which distilled at 109°–118° C./0.25 mm. and had a refractive index, $n_D^{20}$, of 1.4491, seventy-one grams of a mixture of 74% diethyl n-butoxymaleate and 26% diethyl α,α-di-(n-butoxy)succinate (as estimated from saponification numbers), which distilled at 118°–121° C./0.25 mm. and had a refractive index $n_D^{20}$, of 1.4479, and twenty-eight grams of a mixture of 50% maleate and 50% succinate. The yield of combined succinate and maleate was 81%.

*Example 7*

A mixture of 131 grams (0.5 mole) of diethyl α,α-diethoxysuccinate, 102 grams (1.0 mole) of 2-ethylbutanol, and one milliliter of the boron trifluoride-ethyl ether complex was heated in a Claisen flask. There was obtained on distillation forty grams of ethanol, which distilled at 84°–101° C. with superheating and had a refractive index, $n_D^{20}$, of 1.3719. The distillation was continued in vacuo. There were obtained twenty-two grams of unreacted 2-ethylbutanol, which distilled at 38°–95° C./.03 mm. and had a refractive index, $n_D^{20}$, of 1.4220, thirteen grams of a mixture of 40% diethyl 2-ethylbutoxymaleate and 60% diethyl α,α-di(2-ethylbutoxy)-succinate (as estimated from refractive index), which distilled at 95°–122° C./0.25 mm. and had a refractive index, $n_D^{20}$, of 1.4470, seventy-four grams of a mixture of 35% maleate and 65% succinate, which distilled at 122°–132° C./0.25 mm. and had a refractive index, $n_D^{20}$, of 1.4460, and sixty-eight grams of a mixture of 15% maleate and 85% succinate, which distilled at 119°–132° C./0.1 mm. and had a refractive index, $n_D^{20}$, of 1.4435. Redistillation of the last fraction yielded a sample of pure diethyl α,α-di(2-ethylbutoxy)-succinate, which distilled at 125°–128° C./0.1 mm., had a refractive index, $n_D^{20}$, of 1.4410, and gave the following analytical values: Saponification equivalent, 182; carbon content, 64.20%, and hydrogen content, 10.31%. Corresponding values for ethyl α,α-di-(2-ethylbutoxy)succinate ($C_{20}H_{38}O_6$) are: Saponification equivalent, 187; carbon content, 64.17%, and hydrogen content, 10.22%.

The methods shown above may also be applied to the interaction of the same ether esters and mercaptans. The alcohol ROH is displaced and the mercapto group, R'S—, is introduced. Thus, ethyl β,β-diethoxypropionate yields ethyl β,β-dibutylthiopropionate when heated with butyl mercaptan in the presence of a boron trifluoride catalyst. Similarly, diethyl diethoxysuccinate yields diethyl α,α-diethylthiosuccinate.

The reaction here disclosed is one of considerable utility. It provides a method of obtaining ether esters with a great variety of ether groups. These are useful as softeners, plasticizers, solvents, and chemical intermediates.

We claim:

1. A process which comprises reacting together between 20° C. and 200° C. in the presence of a boron trifluoride catalyst an alcohol of the formula R'OH and an ether ester of the formula

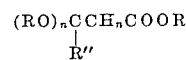

and separating from the reaction mixture the compound,

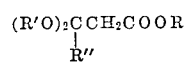

in the above formulas $n$ representing an integer from one to two, inclusive, R'' representing a member of the class consisting of hydrogen and the —COOR group, R representing the residue of a neutral, non-tertiary, monohydric alcohol, ROH, which residue does not react with an alkali and which contains not over twelve carbon atoms, and R' representing the residue of a neutral, non-tertiary, monohydric alcohol which does not react with acids which boils higher than the alcohol ROH, and which contains not over eighteen carbon atoms.

2. A process which comprises reacting together between 20° C. and 200° C. in the presence of a boron trifluoride catalyst an alcohol of the formula R'OH and an ether ester of the formula

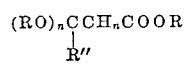

removing about $n$ moles of the alcohol ROH from the reaction mixture per mole of said ether ester, and separating the compound,

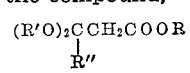

in the above formulas $n$ representing an integer from one to two, inclusive, R'' representing a member of the class consisting of hydrogen and the —COOR group, R representing the saturated hydrocarbon residue of not over two carbon atoms of a non-tertiary, monohydric aliphatic alcohol, ROH, and R' representing the hydrocarbon residue of a non-tetiary, monohydric alcohol which is free of acyclic β,γ-unsaturation which boils higher than ethyl alcohol, and which contains not over eighteen carbon atoms.

3. A process which comprises reacting together between 20° C. and 200° C. in the presence of a boron trifluoride catalyst an alcohol of the formula R'OH and an ether ester of the formula

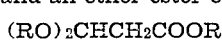

removing about two moles of the alcohol ROH from the reaction mixture, and separating the compound, $$(R'O)_2CHCH_2COOR$$

in the above formulas R representing an alkyl group of not over two carbon atoms and R' representing an alkyl group larger than R and of not over twelve carbon atoms.

4. A process which comprises reacting together between 20° C. and 200° C. in the presence of a boron trifluoride catalyst an alcohol of the formula R'OH and the compound $$(C_2H_5O)_nCHCH_nCOOC_2H_5$$

removing $n$ moles of ethyl alcohol, and separating the compound $$(R'O)_2CHCH_2COOC_2H_5$$

$n$ being an integer from one to two and R' being an alkyl group which is larger than the ethyl group and contains not over twelve carbon atoms.

5. The process of claim 4 in which R' is the butyl group.

WILLARD J. CROXALL.

No references cited.